(12) United States Patent
Klug et al.

(10) Patent No.: US 6,710,900 B1
(45) Date of Patent: Mar. 23, 2004

(54) HOLOGRAMS EXPOSED AND PROCESSED ON PLASTIC SUBSTRATES

(75) Inventors: Michael A. Klug, Austin, TX (US); Qiang Huang, Austin, TX (US); Walter G. Stierhoff, Jr., Wimberly, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 156 days.

(21) Appl. No.: 09/694,239

(22) Filed: Oct. 23, 2000

(51) Int. Cl.⁷ .............................. G03H 1/02; G03H 1/04
(52) U.S. Cl. ..................... 359/3; 359/1; 430/1; 430/2
(58) Field of Search ..................... 359/1, 3, 15, 2; 430/1, 2, 221.1, 230.1

(56) References Cited

U.S. PATENT DOCUMENTS

| | | | |
|---|---|---|---|
| 3,660,090 A | * 5/1972 | Curran et al. ................. | 359/3 |
| 4,826,290 A | * 5/1989 | Wreede et al. ................. | 359/3 |
| 5,698,345 A | * 12/1997 | Ohe et al. ..................... | 359/3 |
| 5,726,782 A | * 3/1998 | Kato et al. .................... | 359/3 |
| 5,930,011 A | * 7/1999 | Gambogi et al. ............. | 359/15 |
| 6,081,354 A | 6/2000 | Gambogi, Jr. et al. ........ | 359/15 |

FOREIGN PATENT DOCUMENTS

EP  0 297 051 A2  * 6/1988

* cited by examiner

Primary Examiner—Audrey Chang
(74) Attorney, Agent, or Firm—Campbell Stephenson Ascolese LLP; Marc R. Ascolese

(57) ABSTRACT

A holographic recording material coupled to a plastic substrate can be exposed to an interference pattern formed by at least one coherent light source, and subsequently processed, thereby eliminating the need to transfer the holographic recording material from a glass substrate to the plastic substrate. Additionally, by performing a post-exposure heating step in a liquid bath, the formation of unwanted bubbles between the plastic substrate and the holographic recording material is at least in part prevented.

31 Claims, 4 Drawing Sheets

HOLOGRAMS EXPOSED AND PROCESSED ON PLASTIC SUBSTRATES

BACKGROUND OF THE INVENTION

1. Field of the Invention

The present invention relates in general to the field of hologram production and display and, more particularly, to hologram production on plastic substrates.

2. Description of the Related Art

One-step hologram (including holographic stereogram) production technology has been used to satisfactorily record holograms in holographic recording materials without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam. Examples of techniques for one-step hologram production can be found in the U.S. Patent Application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety.

In general, the holographic recording materials used in the fabrication of holograms include photopolymerizable compositions, dichromated gelatin, and silver halide emulsions. These holographic recording materials are typically placed on a glass substrate before used in hologram production equipment (e.g., a "holographic printer"). Glass is a useful substrate because of its good optical properties (e.g., high transmission, low distortion, low birefringence) and because of other beneficial mechanical properties including flatness, dimensional stability, scratch resistance, and chemical inertness.

However, because glass is relatively heavy and fragile, it is typically an unsuitable substrate for final placement of the holographic recording material, shipping of the finished hologram, and display of the finished hologram. This is particularly true for large format holograms or hologram tiles whose size is typically on the order of several feet.

Consequently, producers of holograms often prepare the hologram with the holographic recording material coupled to a glass substrate. The preparation typically includes both recording the hologram (i.e., exposing the holographic recording material to a suitably prepared interference pattern formed by one or more coherent light sources) and developing, curing, or fixing the holographic recording material, which can include, for example, exposing the holographic recording material to an ultraviolet light source and heating the holographic recording material. As is well known to those having ordinary skill in the art, these post-processing steps (e.g., developing, curing, or fixing the holographic recording material) depend in large part upon the type holographic recording material used.

Once the hologram has been prepared, it is often removed from the glass substrate, and placed on a plastic substrate that is stronger and lighter than the glass substrate, and thus more suitable for transporting and displaying the finished hologram. Unfortunately, the process of removing the finished hologram from the glass substrate and placing it on a plastic substrate introduces multiple handling steps that consume inordinate amounts of time. Moreover, the process risks the integrity of the hologram, increases the likelihood that the holographic recording material will be damaged (e.g., torn or scratched), and often leads to unwanted distortion of the image produced by the hologram.

Accordingly, it is desirable to eliminate steps from the hologram fabrication procedure in order to provide added efficiency, reduced costs, and higher quality final products.

SUMMARY OF THE INVENTION

It has been discovered that a holographic recording material coupled to a plastic substrate can be exposed to an interference pattern formed by at least one coherent light source, and subsequently processed, thereby eliminating the need to transfer the holographic recording material from a glass substrate to the plastic substrate. Additionally, by performing a post-exposure heating step in a liquid bath, the formation of unwanted bubbles between the plastic substrate and the holographic recording material is at least in part prevented.

By performing the exposure and post-processing of the holographic recording material on the same substrate that will be used for final mounting and display, there is less opportunity for contaminant introduction, handling stress and image artifact introduction. Plastic substrates also allow for pre-exposure and post-exposure flexibility so that curved substrate images can be made. Plastic substrates can be easily made with other features such as colors, textures, and coatings that are useful for various types of holographic displays. Plastic substrates are lighter than glass substrates, thereby requiring less work to move in the holographic exposure system. This can result in shorter total exposure times and reduced vibrational artifacts since the force needed to move the substrate can be less than that of glass. The final product is lighter and less fragile than glass.

Accordingly, one aspect of the present invention provides a method of producing a hologram on a plastic substrate. A holographic recording material layer coupled to the plastic substrate is provided. The holographic recording material layer coupled to the plastic substrate is exposed to an interference pattern formed by at least one coherent light source. The exposed holographic recording material layer coupled to the plastic substrate is heated while the exposed holographic recording material layer coupled to the plastic substrate is in one of a liquid bath and a steam bath.

Another aspect of the invention provides a hologram comprising a plastic substrate and an exposed holographic recording material layer coupled to the plastic substrate. The exposed holographic recording material layer includes an interference pattern formed by at least one coherent light source, wherein the exposed holographic recording material layer coupled to the plastic substrate has been heated in one of a liquid bath and a steam bath.

Still another aspect of the present invention provides another method of producing a hologram on a plastic substrate. A holographic recording material layer coupled to the plastic substrate is provided along with a barrier layer coupled to the holographic recording material layer. The holographic recording material layer coupled to the plastic substrate is exposed to an interference pattern formed by at least one coherent light source. At least a portion of the barrier layer is dissolved.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following sets forth a detailed description of the best contemplated mode for carrying out the invention. The description is intended to be illustrative of the invention and should not be taken to be limiting.

Figure 1A:
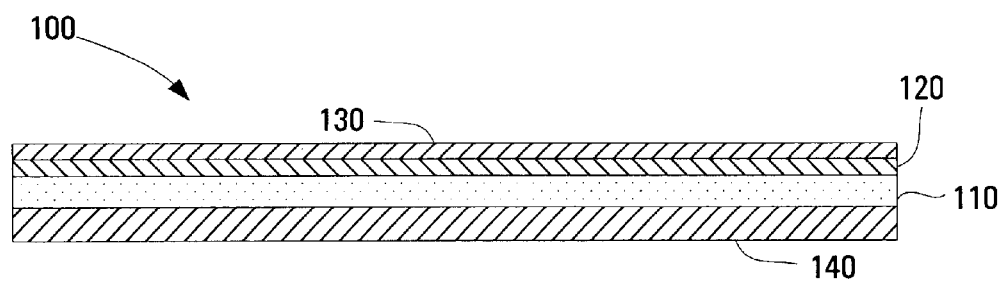
FIGS. 1A–1D illustrate several steps in preparing a holographic recording material for exposure to an interference pattern.

FIG. 1A illustrates a typical photopolymer holographic film 100 as it is delivered from the film's manufacturer. Holographic film 100 includes a holographic recording material layer 110, a base sheet 140, a barrier layer 120, and a cover sheet 130.

Although a variety of different types of holographic recording material can be used with the techniques discussed herein, including photopolymerizable compositions, dichromated gelatin, and silver halide emulsions, holographic recording material layer 110 is preferably formed from a photopolymer. Photopolymers include a wide range of materials that undergo physical, chemical, or optical changes through selective polymerization when exposed to light. Changes in the photopolymer's refractive index, transparency, adhesion, and/or solubility differentiate light and dark regions when these materials are exposed to an activating light source. Photopolymers capable of recording volume phase holograms include those developed by Canon Incorporated (based on polyvinyl carbazole), Polaroid Corporation (based on polyethylene amine/acrylate), and E. I. du Pont de Nemours and Company (based on polyvinyl acetate and polymethyl methacrylate). Those having ordinary skill in the art will readily recognize that a variety of different photopolymer compositions can be used in the practice of the inventions described herein. Nevertheless, preferred photopolymer films are provided by E. I. du Pont de Nemours and Company under the trade designations, for example, OmniDex™ 706, HRF-800X001-15, HRF-750X, HRF-700X, HRF-600X, and the like.

Base sheet 140 and cover sheet 130 provide protection to holographic recording material layer 110, as well as dimensional stability to assist in the handling of the holographic film. Base sheet 140 and cover sheet 130 are typically formed from polymer films, such as polyethylene, polypropylene, cellulose, polyvinyl chloride (PVC), and polyethylene terephthalate (PET). Barrier layer 120 is optional, but is useful to prevent interlayer diffusion of sensitizing dyes within holographic recording material layer 110, and to provide protection from oxygen during exposure. Additionally, barrier layer 120 acts as (1) a differential release layer, facilitating removal of cover sheet 130; and (2) a chemical barrier allowing the use of a coupling fluid (e.g., a paraffinic hydrocarbon) during exposure and a broad range of adhesives for subsequent capping or finishing of the hologram. When used, barrier layer 120 must be transparent to the light to be carried through it, i.e., for exposing holographic recording material layer 110, and is preferably non-birefringent. Such a barrier layer can be made of transparent polymer(s) and is preferably made of polyvinyl alcohol (PVA).

Figure 1B:
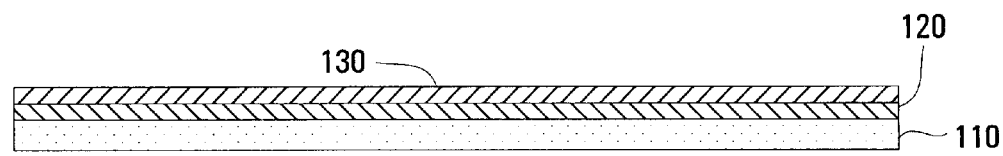
Figure 1C:
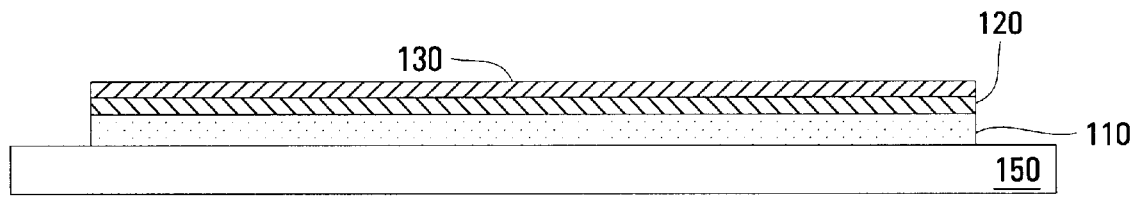
Figure 1D:
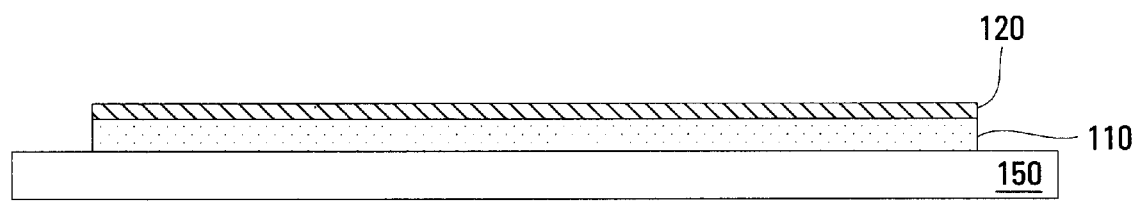

In preparation for placement of the holographic recording material layer 110 on a substrate, base sheet 140 is removed from holographic film 100 as shown in FIG. 1B. The remaining portions of holographic film 100 (i.e., a holographic recording material layer 110, a barrier layer 120, and a cover sheet 130) are then placed on plastic substrate 150, as illustrated in FIG. 1C. The natural tackiness of recording material layer 110 usually is sufficient to bind recording material layer 110 to plastic substrate 150. Because at least some of the light used to record a hologram in holographic recording material layer 110 typically passes through plastic substrate 150, plastic substrate 150 preferably has good optical and material qualities including, for example, low scatter, flatness, low or no birefringence, mar-resistance, strength, and suitable thickness. Preferred materials for plastic substrate 150 include polycarbonates such as Lexan™ available from General Electric Company, and acrylics such as Plexiglas™. As seen in FIG. 1D, cover sheet 130 is then removed in preparation for recording the hologram.

Figure 2:
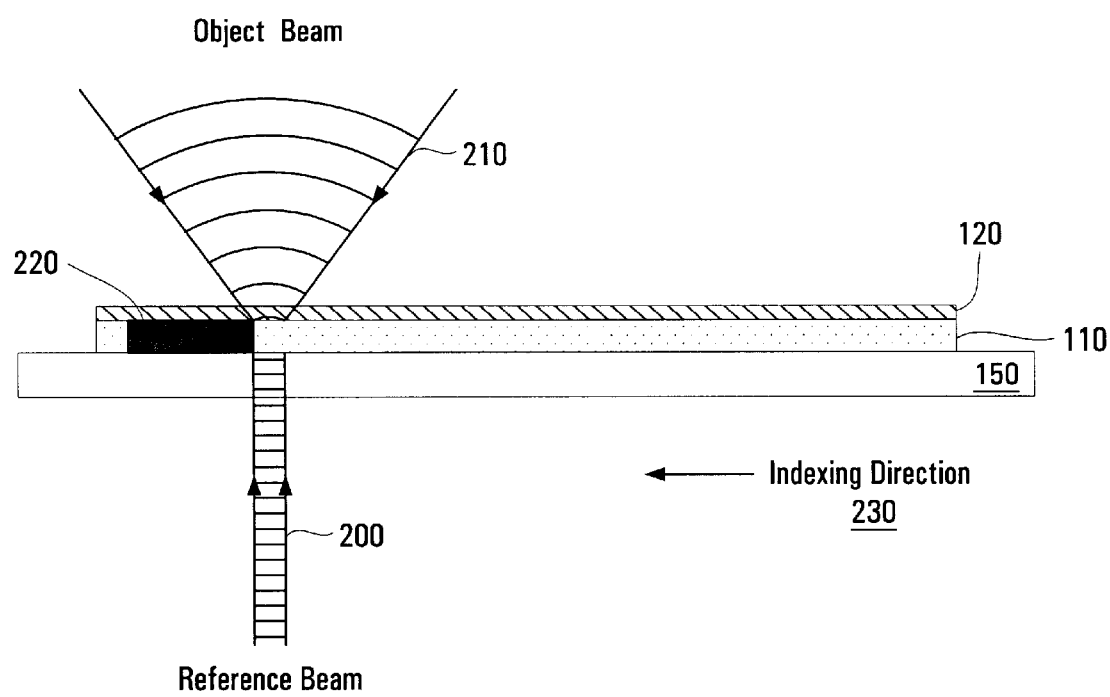
FIG. 2 illustrates the process of exposing the holographic recording material to an interference pattern, thereby generating a hologram.

FIG. 2 illustrates the process of recording interference patterns in the holographic recording material layer 110. To accomplish this task, any number of different recording apparatus and techniques can be used, such as the apparatus and techniques for one-step hologram production found in the aforementioned U.S. patent application Ser. No. 09/098,581. The disclosure of U.S. patent application Ser. No. 09/098,581 is merely illustrative, and those having ordinary skill in the art will readily recognize that a variety of different schemes can be used to produce holograms.

Reference beam 200 and object beam 210 are coherent light sources typically formed from the same original coherent light source (i.e., a laser whose output beam is split into two separate beams). The interference pattern created by the interference of reference beam 200 and object bean 210 is recorded in holographic recording material layer 110. Previously recorded holographic elements (hogels) 220 demonstrate that holographic elements are recorded in discrete locations within holographic recording material layer 110, with the substrate (or beams 200 and 210) being repositioned after each recording step so that multiple holographic elements are recorded throughout holographic recording material layer 110. In the example shown, plastic substrate 150 is adjusted in the direction of indexing direction 230 in order to record respective holographic elements.

FIGS. 3A–3E illustrate several post-processing steps used to generate a finished hologram. After holographic recording material layer 110 is exposed to the interference patterns formed by reference beam 200 and object beam 210, the resulting exposed holographic recording material layer 110 is optionally cured, fixed or exposed to substantially polymerize remaining monomers, consume excess initiators, and fix the holograms within exposed holographic recording material layer 110. This can be accomplished, for example, by using noncoherent actinic radiation, such as from a broadband ultraviolet light source 300, to flood expose the exposed holographic recording material layer 110. This step photohardens or substantially photohardens any remaining photosensitive material in exposed holographic recording material layer 110.

Figure 3A:
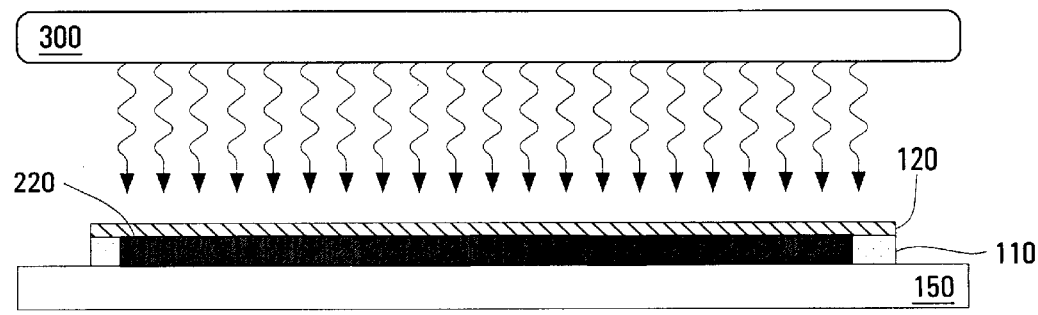
FIGS. 3A–3E illustrate several post-processing steps used to generate a finished hologram.
Figure 3B:
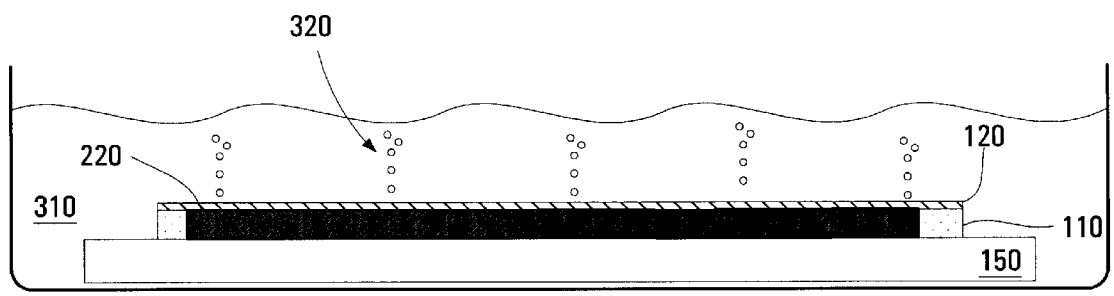

FIG. 3B illustrates another post-processing step wherein the exposed holographic recording material layer 110 is heated. The combined structure of exposed holographic recording material layer 110, barrier layer 120, and plastic substrate 150 is heated to further harden exposed holographic recording material layer 110 and increase its refractive index modulation, its efficiency and the bandwidth of the holographic elements. Heating is typically performed at a temperature below the softening point for plastic substrate 150, so that plastic substrate 150 retains structural integrity and does not warp. For example, when plastic substrate 150 is formed from a polycarbonate material, it is preferred that .the Temperature not exceed 120° C. Note also that this heating step is performed in a liquid bath 310. Heating in liquid bath 310 reduces the formation of gas bubbles between (1) exposed holographic recording material layer 110 and barrier layer 120; and (2) exposed holographic recording material layer 110 and plastic substrate 150. Such gas bubbles are undesirable because they degrade the image quality of images produced by exposed holographic recording material layer 110, and because they cause separation of the exposed holographic recording material layer 110 from plastic substrate 150. Formation of gas bubbles, such as gas bubbles 320 shown escaping from the combined structure, is due at least in part to out-gassing from plastic substrate 150. Note also that during the liquid bath heating step, some or all of barrier layer 120 can be dissolved, as illustrated by the reduced thickness barrier layer shown in FIG. 3B. A variety of different liquids can be used for the liquid bath, but preferred liquids include water, and fluorocarbon solutions.

Heating in liquid bath 310 also provides a convenient and accurate technique for preventing the temperature of plastic substrate 150 (and perhaps other components) from exceeding a maximum temperature limit.

Figure 3C:
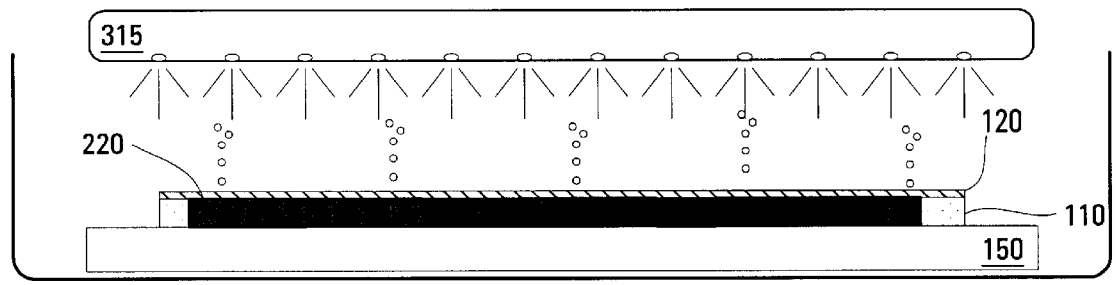

In an alternate embodiment, as illustrated in FIG. 3C, the combined structure is heated in a steam bath 315. Heating in steam bath 315 also reduces the formation of gas bubbles between (1) exposed holographic recording material layer 110 and barrier layer 120; and (2) exposed holographic recording material layer 110 and plastic substrate 150. Furthermore, heating in steam bath 315 provides a convenient and accurate technique for preventing the temperature of plastic substrate 150 (and perhaps other components) from exceeding a maximum temperature limit.

Figure 3D:
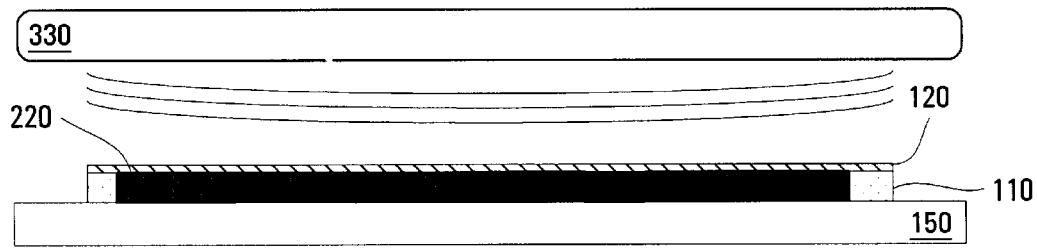

FIG. 3D illustrates an optional heating step where the combined structure of exposed holographic recording material layer 110, barrier layer 120, and plastic substrate 150 is further heated by heater 330 to harden exposed holographic recording material layer 110 and increase its refractive index modulation, its efficiency and the bandwidth of the holographic elements. As before, it is preferred that the heating be performed at a temperature below the softening point for plastic substrate 150. This heating step typically occurs in an oven where the combined structure of exposed holographic recording material layer 110, barrier layer 120, and plastic substrate 150 is placed in a gaseous atmosphere, such as air, nitrogen, or some inert gas.

Figure 3E:
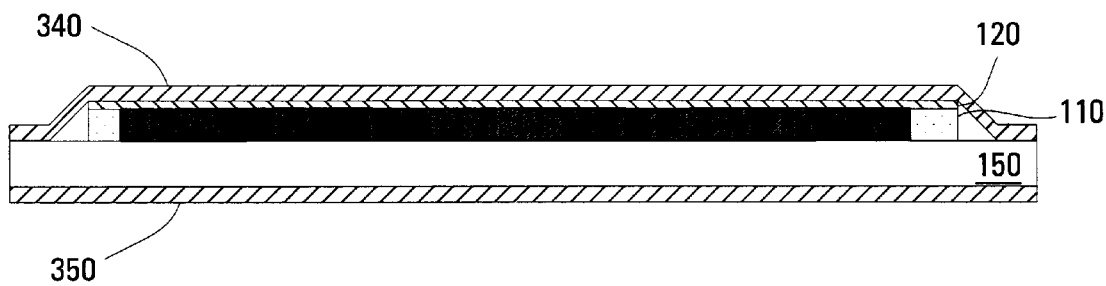

Finally, FIG. 3E illustrates typical examples of finishing materials used so that the resulting hologram is ready for use. Protective layer 340 is applied over exposed holographic recording material layer 110, to seal in the exposed holographic recording material layer and protect it from handling. A scratch-resistant PET material is typically used as protective layer 340, with the protective layer being secured to exposed holographic recording material layer 110, any remaining portions of barrier layer 120, and/or plastic substrate 150 using an adhesive (not shown). Similarly, backing layer 350 is applied to the back side of plastic substrate 150 with an adhesive (not shown). Backing layer 350 is typically formed from an opaque (e.g., black) PET material to enhance the viewability of the images produced by the hologram.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of producing a hologram on a plastic substrate comprising:
   providing a holographic recording material layer coupled to the plastic substrate;
   exposing the holographic recording material layer coupled to the plastic substrate to an interference pattern formed by at least one coherent light source; and
   heating the exposed holographic recording material layer coupled to the plastic substrate while the exposed holographic recording material layer coupled to the plastic substrate is in one of a liquid bath and a steam bath.

2. The method of claim 1 further comprising:
   additionally heating the exposed holographic recording material layer coupled to the plastic substrate while the exposed holographic recording material layer coupled to the plastic substrate is exposed to a gaseous atmosphere.

3. The method of claim 2 further comprising:
   placing the exposed holographic recording material layer coupled to the plastic substrate in an oven, and wherein the gaseous atmosphere is air.

4. The method of claim 2 wherein a temperature of the liquid bath is no more than 120° C., and wherein a temperature of the gaseous atmosphere is no more than 120° C.

5. The method of claim 1 further comprising:
   additionally exposing the exposed holographic recording material layer coupled to the plastic substrate to an ultraviolet light source.

6. The method of claim 1 wherein the holographic recording material layer includes:
   a first side;
   a second side;
   a barrier layer coupled to the first side; and
   a cover sheet coupled to the second side, wherein the providing a holographic recording material layer further comprises:
     removing the cover sheet from the holographic recording material layer; and
     coupling the second side to the plastic substrate.

7. The method of claim 6 wherein the barrier layer is polyvinyl alcohol (PVA).

8. The method of claim 6 wherein the cover sheet is one of polyethylene, polypropylene, cellulose, and polyethylene terephthalate (PET).

9. The method of claim 6 wherein the heating the exposed holographic recording material layer coupled to the plastic substrate while the exposed holographic recording material layer coupled to the plastic substrate is in a liquid bath further comprises:
reducing the formation of gas bubbles between at least one of:
the plastic substrate and the exposed holographic recording material layer; and
the exposed holographic recording material layer and the barrier layer.

10. The method of claim 6 further comprising dissolving at least a portion of barrier layer during the heating the exposed holographic recording material layer coupled to the plastic substrate while the exposed holographic recording material layer coupled to the plastic substrate is in a liquid bath.

11. The method of claim 1 further comprising:
applying a protective layer to the exposed holographic recording material layer; and
applying a backing layer to the plastic substrate.

12. The method of claim 11 wherein the protective layer is one of polyethylene, polypropylene, cellulose, and polyethylene terephthalate (PET); and wherein the backing layer is one of polyethylene, polypropylene, cellulose, and PET.

13. The method of claim 12 wherein the protective layer is scratch-resistant PET, and wherein the backing layer is black PET.

14. The method of claim 1 wherein the holographic recording material layer further comprises one of a photopolymerizable material, a dichromated gelatin, and a silver halide emulsion.

15. The method of claim 1 wherein the plastic substrate further comprises at least one of a polycarbonate material and an acrylic material.

16. The method of claim 1 wherein the liquid bath further comprises at least one of water and a fluorocarbon liquid.

17. A hologram produced according to the method of claim 1.

18. A hologram comprising:
a plastic substrate; and
an exposed holographic recording material layer coupled to the plastic substrate, the exposed holographic recording material layer including an interference pattern formed by at least one coherent light source, wherein the exposed holographic recording material layer coupled to the plastic substrate has been heated in one of a liquid bath and a steam bath.

19. The hologram of claim 18 wherein the exposed holographic recording rial layer coupled to the plastic substrate has been further heated while exposed to a gaseous atmosphere.

20. The hologram of claim 19 wherein the gaseous atmosphere is air.

21. The hologram of claim 19 wherein a temperature of the liquid bath is no more than 120° C., and wherein a temperature of the gaseous atmosphere is no more than 120° C.

22. The hologram of claim 18 wherein the exposed holographic recording material layer coupled to the plastic substrate has been exposed to an ultraviolet light source.

23. The hologram of claim 18 wherein the exposed holographic recording material layer has a first side and a second side coupled to the plastic substrate, the hologram further comprising:
a barrier layer coupled to the first side of the exposed holographic recording material layer.

24. The hologram of claim 23 wherein the barrier layer is polyvinyl alcohol (PVA).

25. The hologram of claim 18 further comprising:
a protective layer coupled to the exposed holographic recording material layer; and;
a backing layer coupled to the plastic substrate.

26. The hologram of claim 25 wherein the protective layer is one of polyethylene, polypropylene, cellulose, and polyethylene terephthalate (PET); and wherein the backing layer is one of polyethylene, polypropylene, cellulose, and PET.

27. The hologram of claim 18 wherein the holographic recording material layer further comprises one of a photopolymerizable material, a dichromated gelatin, and a silver halide emulsion.

28. The hologram of claim 18 wherein the plastic substrate further comprises at least one of a polycarbonate material and an acrylic material.

29. The hologram of claim 18 wherein the liquid bath further comprises at least one of water and a fluorocarbon liquid.

30. A method of producing a hologram on a plastic substrate comprising:
providing a holographic recording material layer coupled to the plastic substrate, and a barrier layer coupled to the holographic recording material layer;
exposing the holographic recording material layer coupled to the plastic substrate to an interference pattern formed by at least one coherent light source; and
dissolving at least a portion of the barrier layer.

31. The method of claim 30 further comprising:
heating the exposed holographic recording material layer coupled to the plastic substrate while the exposed holographic recording material layer coupled to the plastic substrate is in one of a liquid bath and a steam bath.

* * * * *

UNITED STATES PATENT AND TRADEMARK OFFICE
CERTIFICATE OF CORRECTION

PATENT NO. : 6,710,900 B1  
DATED : March 23, 2004  
INVENTOR(S) : Klug et al.

Page 1 of 1

It is certified that error appears in the above-identified patent and that said Letters Patent is hereby corrected as shown below:

Column 7,
Line 51, please replace "rial" with -- material --.

Signed and Sealed this

Thirteenth Day of July, 2004

JON W. DUDAS
*Acting Director of the United States Patent and Trademark Office*